(12) United States Patent
Van Der Schaar (10) Patent No.: US 7,068,717 B2
(45) Date of Patent: Jun. 27, 2006

(54) METHOD AND APPARATUS FOR DYNAMIC ALLOCATION OF SCALABLE SELECTIVE ENHANCED FINE GRANULAR ENCODED IMAGES

(75) Inventor: Mihaela Van Der Schaar, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 987 days.

(21) Appl. No.: 10/015,508

(22) Filed: Dec. 13, 2001

(65) Prior Publication Data
US 2002/0181580 A1 Dec. 5, 2002

Related U.S. Application Data

(60) Provisional application No. 60/217,827, filed on Jul. 12, 2000.

(51) Int. Cl.
*H04N 7/12* (2006.01)
(52) U.S. Cl. .................. 375/240.02; 382/239
(58) Field of Classification Search ........... 375/240.24, 375/240.02, 240.08, 240.09, 240.16, 240.12; 709/219; 382/238, 239
See application file for complete search history.

(56) References Cited

U.S. PATENT DOCUMENTS

| | | | |
|---|---|---|---|
| 6,112,234 A * | 8/2000 | Leiper | 709/219 |
| 6,480,541 B1 * | 11/2002 | Girod et al. | 375/240.12 |
| 6,614,936 B1 * | 9/2003 | Wu et al. | 382/238 |
| 6,700,933 B1 * | 3/2004 | Wu et al. | 375/240.16 |
| 6,788,740 B1 * | 9/2004 | van der Schaar et al. | 375/240 |

* cited by examiner

*Primary Examiner*—Gims Philippe (57) ABSTRACT

A method and system for dynamically selectively enhancing desired area or areas of a video image which are FGS encoded. The method comprising the steps of determining at least one of the FGS encoded macroblocks in each of the FGS encoded bit-planes associated with the desired area or portion of the video image, determining an order of transmission of each of the determined FGS encoded macroblocks within the transmission sequence and advancing each of the determined FGS encoded macroblocks in the transmission sequence order corresponding to a known level of enhancement, wherein the advanced FGS encoded macroblocks are contained in a bit-plane having a higher transmission priority. In one aspect of the invention, the desired area may be selected by interactively by a user. In another aspect, the desired area or areas may be selected automatically.

31 Claims, 9 Drawing Sheets

METHOD AND APPARATUS FOR DYNAMIC ALLOCATION OF SCALABLE SELECTIVE ENHANCED FINE GRANULAR ENCODED IMAGES

RELATED APPLICATIONS

This application is related to commonly assigned:

U.S. Patent Application Ser. No. 60/217,827, entitled "System And Method For Fine Granular Scalable Video With Selective Quality Enhancement," filed on Jul. 12,2000; and U.S. patent application Ser. No. 09/887,747, entitled "Method And Apparatus For Improved Efficiency In Transmission Of Fine Granular Scalable Selective Enhanced Images," filed on Jun. 22, 2001.

FIELD OF THE INVENTION

This invention relates generally to video encoding and more specifically to dynamically allocating selective enhancement Fine Granular Scalable encoded video data.

BACKGROUND OF THE INVENTION

The MPEG-4 Fine-Granular Scalability (FGS) framework allows for different levels of compression for different parts of a video image by using an adaptive quantization technique, referred to as Selective Enhancement. Selective Enhancement of FGS encoded video images is more fully disclosed in U.S. Patent Application Ser. No. 60/217,827, entitled, "System And Method For Fine Granular Scalable Video With Selective Quality Enhancement," filed on Jul. 12, 2000. An improvement to the transmission efficiency of selectively enhanced FGS video signals is more fully disclosed in U.S. patent application, Ser. No. 09/887,747, entitled "Method And Apparatus For Improved Efficiency In Transmission Of Fine Granular Scalable Selective Enhanced Images, filed on Jun. 22, 2001.

Utilizing selective enhancement designated areas of an FGS encoded video image may be transmitted to achieve a higher quality level than non-designated areas of the image. As disclosed in the referred to patents applications, a higher quality level or higher resolution of a transmitted image may be achieved by "shifting" specific or designated areas or regions of FGS encoded image elements to a higher transmission priority level. The selectively enhanced images are thus transmitted out of their normal sequence. The specific or designated areas or regions may be associated with a specific pixel, pixel arrays or sets or pixel arrays, referred to herein as macroblocks. An indication of enhancement factor or shift factor is also associated with each shifted FGS encoded image elements, i.e., macroblocks.

One disadvantage of the current selective enhancement method is that the shifting factors and the area or areas selected for selected enhancement are essentially pre-determined and allocated during the FGS encoding processing. Such selection of enhanced areas may be preformed by an automatic system based on some predetermined rules. For example, data blocks associated with the slowest movement within the image may be selected for enhancement. Alternatively, faces within the image may be more enhanced than the background. However, these rule-based automatic systems often fail to enhance precisely what the user or viewer is interested in. Hence, that is the area or region of interest selected by the automatic system may not coincide with the area or region that is of interest to the user or viewer.

Hence, there is a need to provide a system that allows the user or viewer to select or allocate an area or areas or interest for transmission as enhanced FGS encoded data.

SUMMARY OF THE INVENTION

A method and system to dynamically select or allocate an area or areas within FGS encoded video images is presented. The method comprising the steps of determining at least one of the FGS encoded macroblocks in each of the FGS encoded bit-planes associated with the desired area or portion of the video image, determining an order of transmission of each of the determined FGS encoded macroblocks within the transmission sequence and advancing each of the determined FGS encoded macroblocks in a transmission sequence order corresponding to a known level of enhancement, wherein the advanced FGS encoded macroblocks are contained in a bit-plane having a higher transmission priority. In one aspect of the invention, the desired area may be selected interactively by a user. In another aspect, the desired area or areas may be selected automatically.

It is to be understood that these drawings are solely for purposes of illustrating the concepts of the invention and are not intended as a level of the limits of the invention. It will be appreciated that the same reference numerals, possibly supplemented with reference characters where appropriate, have been used throughout to identify corresponding parts.

DETAILED DESCRIPTION OF THE INVENTION

Figure 1A:
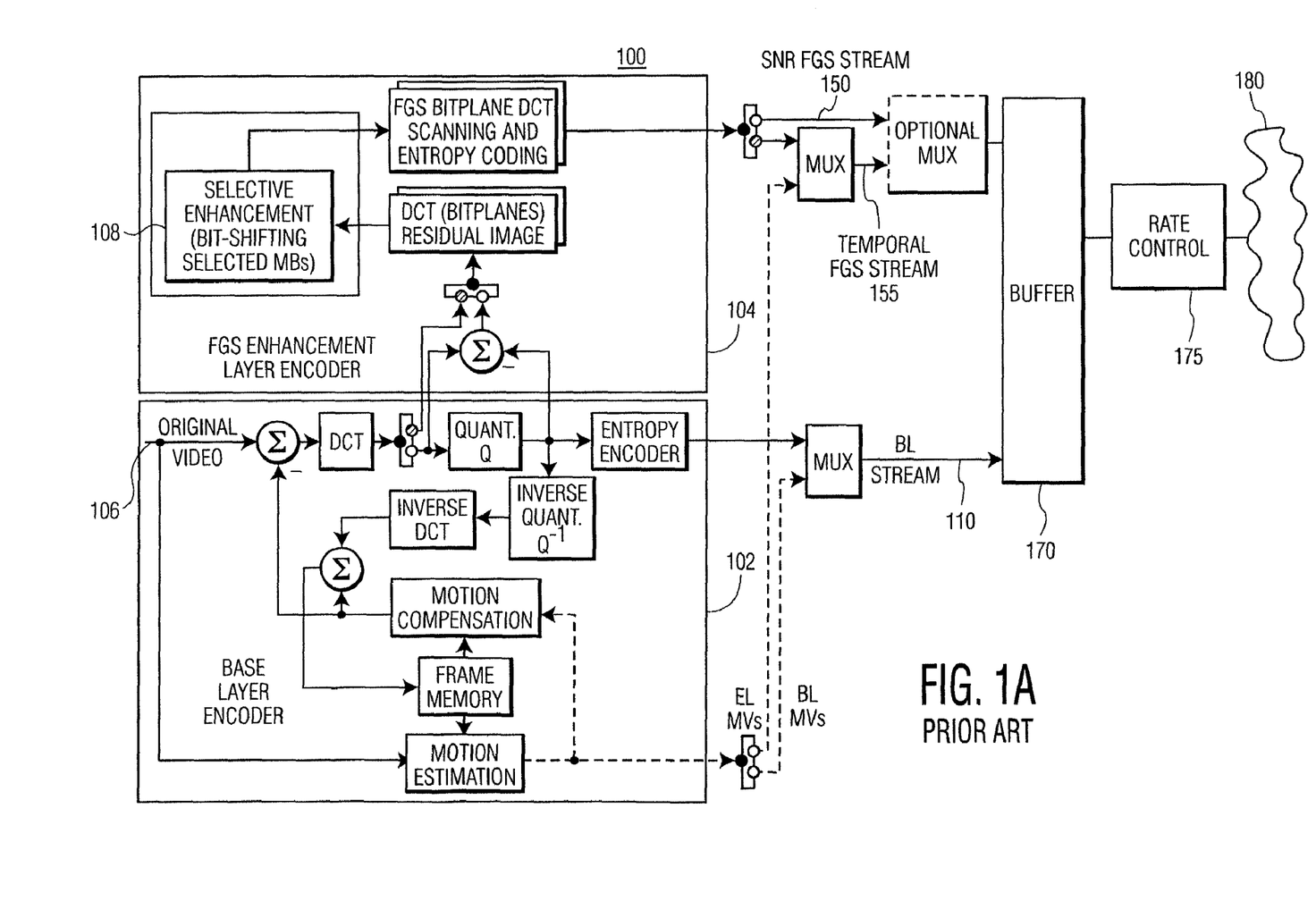
FIG. 1a depicts a conventional FGS system employing selective enhancement technology.

FIG. 1a illustrates a conventional Fine Granular Scalability (FGS) video encoding system 100 employing pre-determined selective enhancement technology. As illustrated, this system is composed of a base layer encoder 102 and an enhancement layer encoder 104. Original video signal 106 is digitally encoded and quantized by base layer encoder 102 which produces base layer (BL) 110. Base layer 110 contains sufficient information that is representative of a minimally acceptable video signal. Base layer signal 110 may also include motion compensation information. Motion compensation is well known in the art and need not be discussed herein. Base layer signal 110 is then provided to buffer/rate transmitter 170 for subsequent transmission over network, e.g., Internet, 180.

Original video signal 106 is also provided to enhancement layer encoder 104 along with a digitized and quantized version of base layer 110. Enhancement layer encoder 104 determines a residual error between the original video signal and the quantized base layer 110. Enhancement layer encoder 104 creates quality improvement (SNR) enhancement layer 150 containing information items, which when applied to transmitted base layer 110 removes the errors of quantization and improves the transmitted image quality. SNR Enhancement layer signal 150 is then provided to buffer 170 for subsequent transmission through rate controller 175 over network, e.g., Internet, 180.

Also illustrated is temporal FGS encoded enhancement layer (FGST) 155, which includes motion compensation information regarding the base layer 110 and enhancement layer 150. Temporal enhancement layer signal 155 is also provided to buffer 170 for subsequent transmission through rate controller 175 over network 180.

As is understood in transmission of FGS encoded video images, the quantity of information items within enhancement layers 150, 155 that are transmitted depends upon the bandwidth available. Hence, each information item within enhancement layer 150, 155 may not be transmitted during a frame. Consequently, those areas of a transmitted image that are transmitted first, or at a higher priority, tend to have higher quality or greater resolution than those transmitted latter.

Selective Enhancement device 108 within FGS encoder 104 provides for designated areas within an image to be transmitted at a higher transmission priority than other, non-designated, areas or regions of the image. Selective enhancement is more fully disclosed in the referred to patent applications, which are incorporated by reference herein.

Figure 1B:
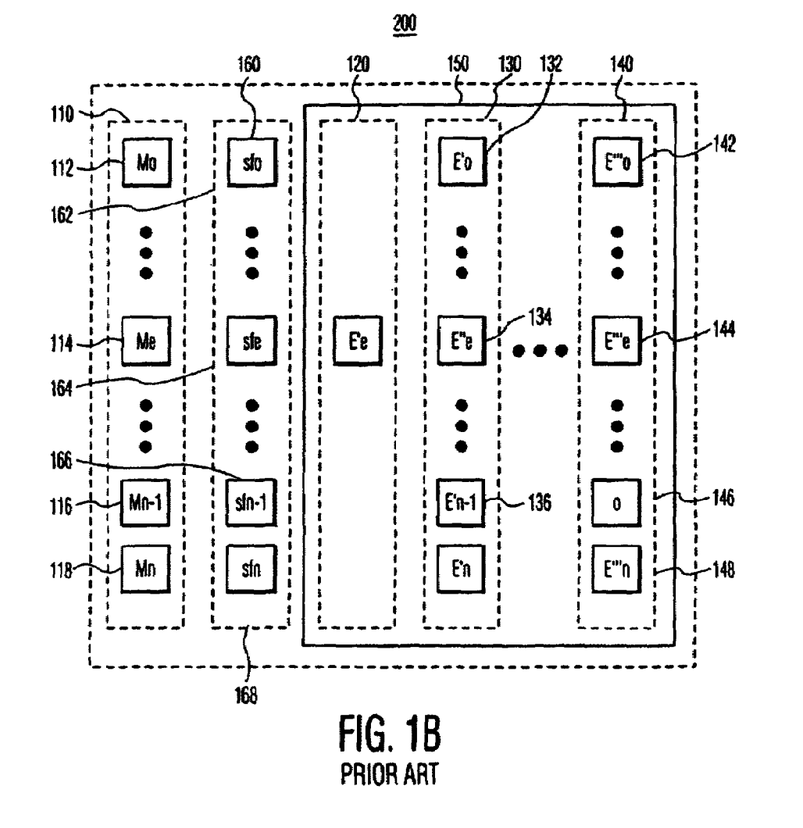
FIG. 1b illustrates a conventional selectively enhanced FGS encoded video image.

FIG. 1b illustrates a conventional FGS encoded image 200 with predetermined selective enhancement generated in accordance with the encoder illustrated in FIG. 1a. As shown, image 200 is composed of a base layer 110, an enhancement layer 150 and a shift factor layer 160. As discussed more fully in the referred to patent applications, video images FGS encoded are formulated into blocks, which are conventionally representative of image information contained within six 8×8 data blocks, conventionally referred to as macroblocks. The encoded image is stored in levels of information, referred to as bit planes. Each bit-plane contains progressively more detailed information (e.g., non-zero DCT residual coefficients) regarding the video information of each macroblock. For example, a portion of a video image may be stored in base layer block 112 and progressively finer image resolution data is stored in enhancement layer block 132, 142, etc. Hence, in accordance with FGS encoding principles, a minimum resolution video image is stored in base layer 110, composed of information blocks, macroblocks or data blocks, 112, 114, 116, 118, etc., while, progressively finer resolution information regarding corresponding portions of the video image are stored in enhancement layer 150 composed of bit-planes 120, 130 and 140, etc. Thus, in this illustrative case, bit-plane 130 includes information regarding the most significant bit or byte of corresponding macroblocks, while bit-plane 140, includes information regarding the least significant bit or byte of corresponding macroblocks.

Bit-plane 120 contains information regarding selectively enhanced macroblocks scaled to achieve a higher transmission priority. In this exemplary illustration, the information regarding the image is scaled such that the most significant bit or byte of corresponding macroblock 114, represented as $E'_e$, is transmitted prior to the most significant bit or byte corresponding to first macroblock 110, represented as $E'_o$. Similarly, information regarding the next most significant bit or byte corresponding to macroblock 114, represented as $E''_e$ is "shifted" or a scaled such that it is transmitted prior to the next most significant bit or byte of first macroblock 110, represented as $E''_o$. Information regarding the shifting or scaling of corresponding macroblocks is located in shift factor layer 160, which is composed, in this illustrated example, of blocks 162, 164, 166, 168, that provide information for each corresponding macroblock. As is known, shifting factors in 160 are not transmitted all at the same time, but rather before enhancement layer 150. They are transmitted for each macroblock (MB) independently, as soon as that MB becomes significant (i.e., non-zero DCT residual coefficients). Hence, either a MB will be transmitted when it is significant or alternatively, a non-zero-macroblock symbol (NULL) will be transmitted to indicate that that MB is still insignificant. The first time a MB becomes significant, the corresponding Selective Enhancement (SE) shifting factor 160 will also be transmitted.

Each FGS encoded macroblock information item stored in bit-planes corresponding to associated frames of video source is then stored in device 170. Device 170 may be a permanent or semi-permanent medium, such as a Read-only Memory (ROM), Random Access Memory (RAM), magnetic or optical disk, etc., for transmission over a communication network, such as the Internet, at a latter time. Although an exemplary selective enhanced composition image 200 is shown, it would be further understood that multiple versions of video source 106 may be concurrently stored on at least one permanent or semi-permanent medium for transmission in accordance with different bandwidth or bit rate conditions. Although not shown, it would be understood that FGST enhancement layer 155 would similarly be composed of macroblocks and shifted accordingly.

Figure 2:
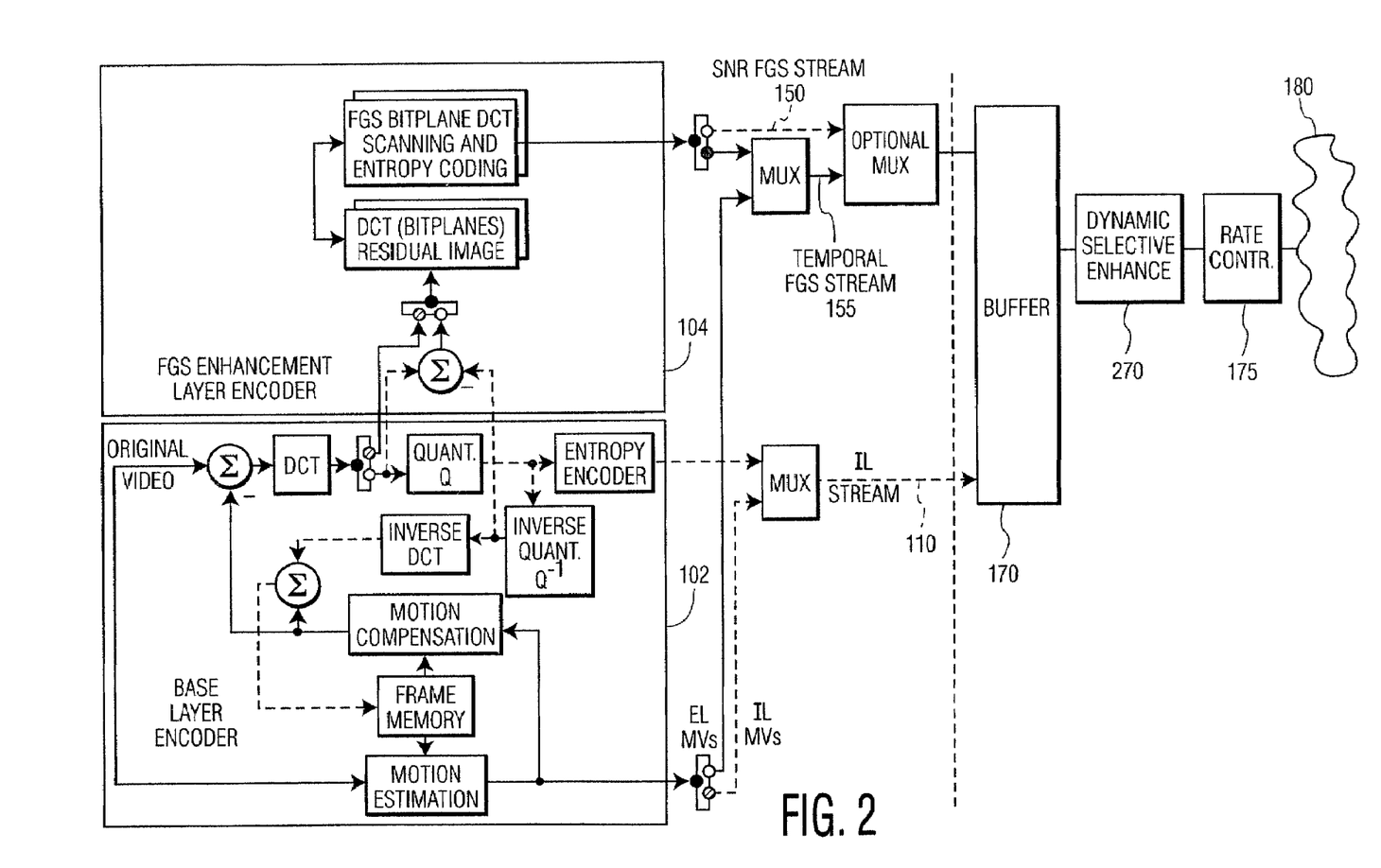
FIG. 2 illustrates an FGS encoding system for dynamically selectively enhancing an FGS encoded image in accordance with the principles of the present invention.

FIG. 2 illustrates an exemplary encoding system in accordance with the principles of the present invention. In this exemplary system, base layer 110, FGS enhancement layer 150 and FGST enhancement layer 155 are stored in buffer 170 in a conventional, non-selectively enhanced configuration. Macroblock data is then provided to dynamic selective enhancement module 210 to dynamically determine the transmission sequence when selective enhancement is requested. Whether macroblock data or information is or is not selectively enhanced, macroblock data or information is provided to rate controller 175 for subsequent transmission over network 180.

Figure 3A:
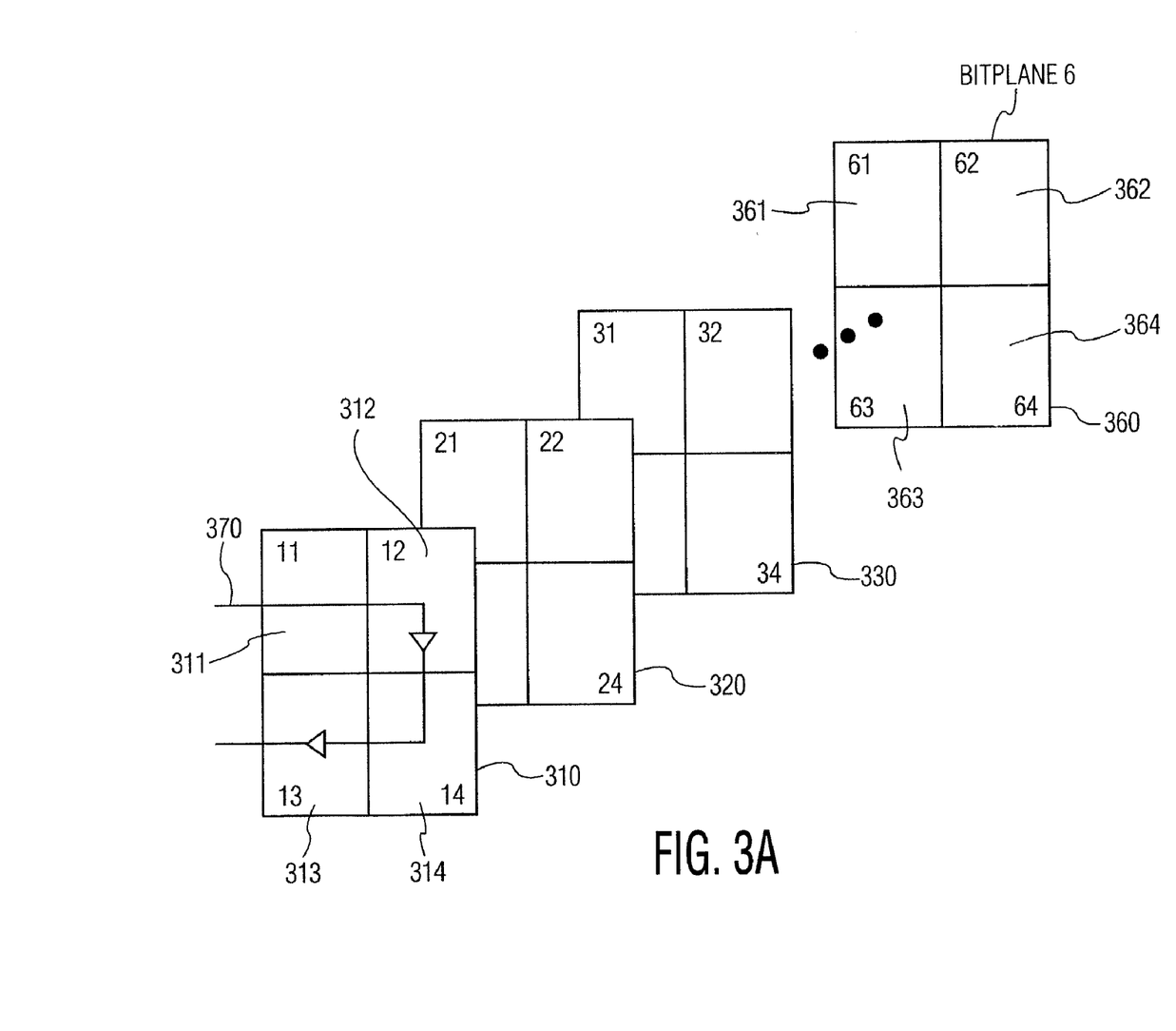
FIG. 3a illustrates a conventional non-selectively enhanced FGS encoded video image.

FIG. 3a illustrates the bit-plane structure of a conventional FGS encoded video image, which is simply represented as being composed of four macroblocks. Further, the video images are FGS encoded over six bit-planes, wherein bit plane 310, composed of macroblocks 311, 312, 313 and 314, is representative of base layer 110 and the subsequent bit planes 320–360, respectively, are representative of enhancement layer 150. Thus, macroblocks, 321, 331, 341, etc., contain information regarding progressively finer resolution to the video information contained in macroblock 311.

In this example, the video image is transmitted using a conventional row raster-type scan 370, which, in this illustrative example, transmits macroblock data in odd rows from left to right and in even row from right to left. Hence, data in macroblock 311 is first transmitted, then the data in macroblock 312 followed by the data in macroblocks 314 and 313, respectively. Then, if sufficient bandwidth is available, data in macroblocks 321, 322, 324 and 323, which are representative of the first level of enhancement layer data, is next transmitted. Data in bit-planes 330–360 may also be transmitted if sufficient bandwidth is available. Although a row raster-type scan is illustrated, it would be understood, that horizontal and/or vertical progressive/interlaced scans are also contemplated to be within the scope of the invention.

Figure 3B:
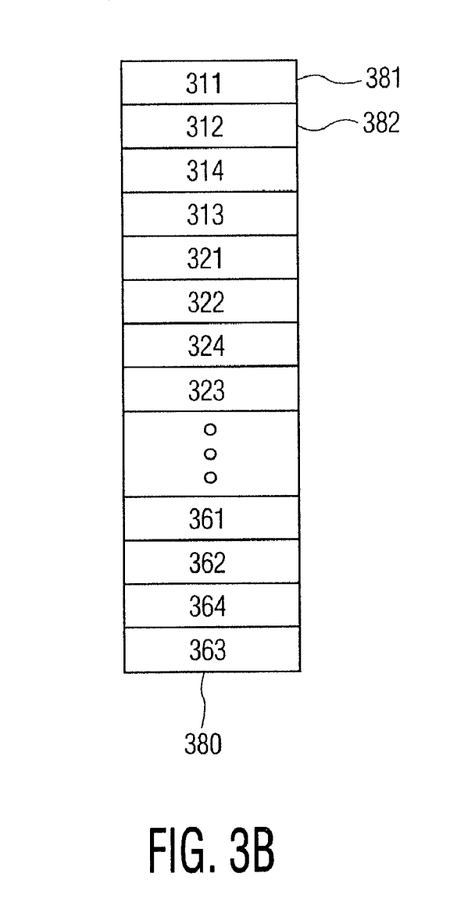
FIG. 3b illustrates an exemplary transmission sequence order associated with the encoded video image illustrated in FIG. 3a in accordance with the principles of the present invention.

FIG. 3b illustrates an exemplary transmission sequence order 380 corresponding to the FGS encoded bit-plane structure depicted in FIG. 3a. In the exemplary transmission sequence order shown, pointers to, or vectors associated with, each macroblock within each bit-plane is stored in the order of transmission. Thus, for the exemplary horizontal raster scan shown in FIG. 3a, a pointer to, or vector associated with, macroblock 311 is stored as a first entry in transmission sequence order 380 and corresponding pointers to, or vectors associated with, macroblocks 312, 314, and 313 are then sequentially stored in sequence control table 380. Similarly, corresponding pointers to, or vectors associated with, each macroblock in each bit-plane are stored in the order of their transmission. As would be understood, rate controller 175, illustrated in FIG. 1a or 2, includes a process, as will be further described, that sequentially proceeds through each element of transmission sequence order 380 to determine the first/next macroblock to be transmitted. As would be understood, an alternate order of macroblock transmission would cause an alternative order of storage of associated macroblock pointers or vector. Hence, in accordance with the principles of the invention, the exemplary transmission sequence of macroblock rather than being fixed, or "hard-wired," is determined by the order selected in transmission sequence order 380.

Figure 4A:
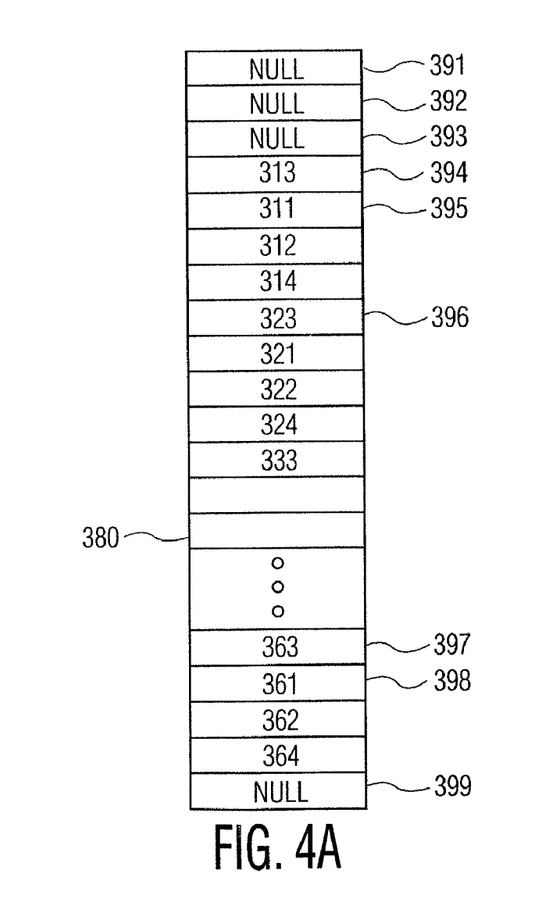
FIG. 4a illustrates an exemplary adaptation of the exemplary transmission sequence order shown in FIG. 3b.

FIG. 4a illustrates an adaptation of transmission sequence order 380 in response to a request to selectively enhance a desired portion of an image corresponding to that shown in macroblock 313. In this case, corresponding pointers to, or vectors associated with, macroblock 313 and macroblocks in subsequent bit-planes, i.e., macroblocks 323, 333, 343, 353, 363, are shifted or re-positioned in transmission table order 380 to accommodate the requested enhancement. This shifting or re-positioning of the order of transmission provides a higher transmission priority for the requested image portion. Thus, information regarding macroblock 313 represented as pointer or vector 394 is positioned prior to information regarding macroblock 311 represented as pointer or vector 395. Similarly, information regarding macroblock 363 represented as pointer or vector 397 is positioned prior to information regarding macroblock 361 represented as pointer or vector 398.

It would be understood that to provide compatibility with many existing receiving systems and limit the need for special receiving or transmission equipment, a conventional raster-type transmission sequence is maintained. In this case, pointers or vectors 391, 392, 393, are introduced into transmission sequence order 380 to compensate for selective enhancement or higher transmission priority of the requested macroblock 311. In this illustrative example, the pointers or vectors are set to a "not significant" macroblock or block. As would be appreciated, the pointer or vector may similarly be set to an unused value, such as "0", which would be indicative of a "not significant" character or block. "Not significant" macroblocks are transmitted to indicate to a corresponding receiving system to zero fill the received macroblock. Similarly, to maintain the transmission order after all selective enhanced macroblocks are transmitted, "0" pointers are introduced in the bit-planes of the selectively enhanced macroblocks. Hence, "0" pointers are placed in transmission control table 380 at locations corresponding to the shifted macroblock information. In this case, "0" pointer are placed at location 399 to indicate a set of zero blocks will be transmitted.

Figure 4B:
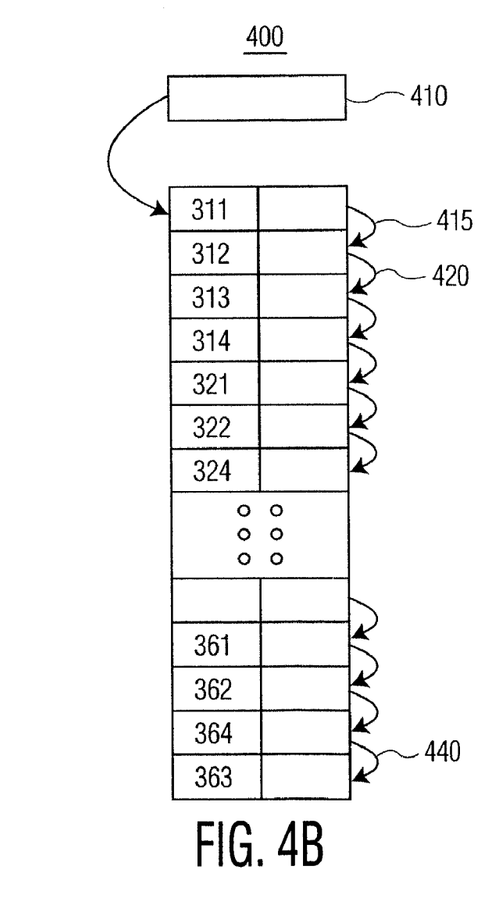
FIG. 4b illustrates a second exemplary transmission sequence order associated with the encoded video image illustrated in FIG. 3a in accordance with the principles of the present invention.
Figure 4C:
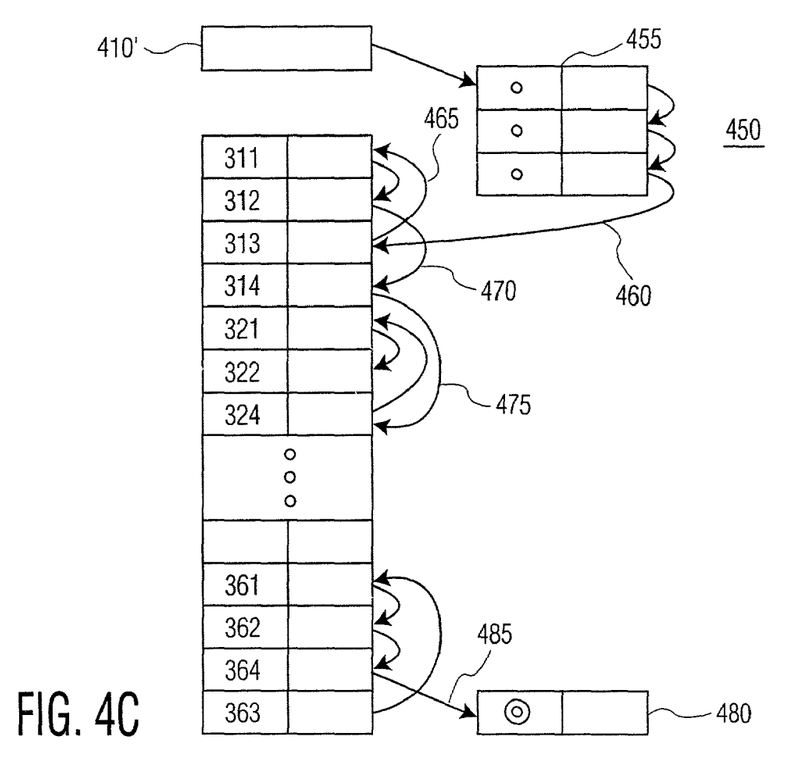
FIG. 4c illustrates an exemplary adaptation of the exemplary transmission sequence order shown in FIG. 4b.

FIGS. 4b and 4c collectively illustrate an alternate embodiment of a transmission sequence order and an exemplary alteration using a link-list structure. FIG. 4b illustrates a transmission sequence order similar to that shown in FIG. 3b. However, in this case, a first pointer or vector is employed to determine a macroblock for transmission, similar that shown in FIG. 3b. A second pointer or vector, 415, 420, . . . 440, etc., is employed to determine a subsequent macroblock for transmission. Thus, rather than sequentially accessing and determining the next macroblock as is done in FIG. 3b, the second pointer or vector is used to determine the next macroblock for transmission. To determine a first entry for transmission a separate value 410 containing a pointer or vector is maintained.

FIG. 4c illustrates an adaptation of the transmission sequence order for selective enhancement or advancement in transmission priority of macroblock 313 of FIG. 3a. In this case, initial value pointer 410 is altered to access a data block 455 of "not significant" values. Data block 455 is employed, in this case, to maintain a known transmission order. The last entry of data block 455 includes a pointer or vector 460 that selects that entry in the transmission sequence that corresponds to macroblock 313. The next macroblock pointer 465 associated with macroblock 313 is then altered to select macroblock 311 for next transmission. Macroblock 312 is then selected as the next macroblock for transmission as the next macroblock pointer associated with macroblock 311 is unaltered. Similarly, macroblock 314 is then selected as the next macroblock for transmission as the next macroblock pointer 470 associated with macroblock 312 is unaltered. However, the next macroblock pointer 475 associated with macroblock 312 is altered to select macroblock 324 for transmission. To complete and maintain the transmission sequence order, a last or final block 480, which includes a "not significant" block may be accessed by a pointer 485 associated with the last transmitted macroblock 364.

As would be appreciated, data block 455 and 480 are employed to maintain a uniform number of macroblocks for each bit-plane. However, it would be understood that the use of either data block 455 or 480 is optional in that non-uniform number of macroblocks per bit-plane may also be maintained and transmitted.

FIGS. 3b, 4a, 4b, and 4c illustrate a linear or sequential order of transmission. It would be known of those skilled in the art to use initial pointer and linked-list and/or double-list to maintain and dynamically alter a transmission sequence.

Further, alternate non-sequential transmission sequences may be maintained using linked-list or double-linked lists.

Although only one macroblock is selectively enhanced to one higher level of transmission priority, it would be understood that any number of macroblocks may be shifted to any higher level of transmission priority. For example, a plurality of macroblocks may be shifted or re-positioned such that the shifted macroblocks may be completely transmitted prior to the transmission of the most significant bit or byte of the unenhanced image.

The dynamic selective enhancement process is further illustrated by the following example. Assuming that an original FGS residual image is encoded over six (6) bit-planes and each bit-plane includes four (4) macroblocks. Further, the most significant byte of the first macroblock is six, the most significant byte of the second macroblock is 3, the most significant byte of the third macroblock is 4 and the most significant byte of the fourth macroblock is 5. The original FGS encoded bit-planes may be represented as:

| Coded_bpx6(MB1) | 0 | 0 | 0 |
| --- | --- | --- | --- |
| Coded_bpx5(MB1) | 0 | 0 | Coded_bpx5(MB4) |
| Coded_bpx4(MB1) | 0 | Coded_bpx4(MB3) | Coded_bpx4(MB4) |
| Coded_bpx3(MB1) | Coded_bpx3(MB2) | Coded_bpx3(MB3) | Coded_bpx3(MB4) |
| Coded_bpx2(MB1) | Coded_bpx2(MB2) | Coded_bpx2(MB3) | Coded_bpx2(MB4) |
| Coded_bpx1(MB1) | Coded_bpx1(MB2) | Coded_bpx1(MB3) | Coded_bpx1(MB4) |

Where "Coded-bpx" refers to the coded bit-plane corresponding to the macroblock; and "0"indicates a not significant value.

Assuming that macroblock 3 is selectively enhanced by, for example, a factor of three (3), then the number of bit-planes is increased to seven (7) and the selectively FGS encoded macroblocks are represented as:

| 0 | 0 | Coded_bpx4(MB3) | 0 |
| --- | --- | --- | --- |
| Coded_bpx6(MB1) | 0 | Coded_bpx3(MB3) | 0 |
| Coded_bpx5(MB1) | 0 | Coded_bpx2(MB3) | Coded_bpx5(MB4) |
| Coded_bpx4(MB1) | 0 | Coded_bpx1(MB3) | Coded_bpx4(MB4) |
| Coded_bpx3(MB1) | Coded_bpx3(MB2) | 0 | Coded_bpx3(MB4) |
| Coded_bpx2(MB1) | Coded_bpx2(MB2) | 0 | Coded_bpx2(MB4) |
| Coded_bpx1(MB1) | Coded_bpx1(MB2) | 0 | Coded_bpx1(MB4) |

Figure 5:
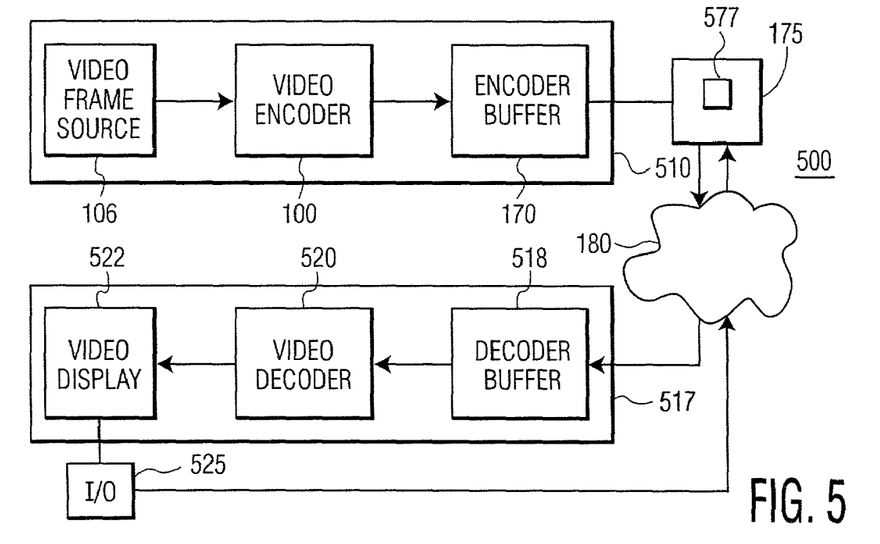
FIG. 5 illustrates an exemplary system for transmission of FGS encoded images in accordance with the principles of the present invention.

FIG. 5 illustrates an exemplary transmission system 500 utilizing the principles of the present invention. In this exemplary system transmission unit 510 is composed of video frame source 106, which receives video frame image information, video encoding unit 100, similar to that illustrated in FIG. 1a without selective enhancement units 108 and in encoder buffer 170, which stores the FGS encoded video image. Transmission rate controller 175 accesses the stored FGS encoded video images contained within encoder buffer 170 and transmits the stored image data over data network 180 in the order stored in an associated transmission sequence table. At receiving system 517, the received data frames are stored in decoder buffer 518 and provided to video decoder 520. The decoded information is then presented on video display 522.

Further illustrated is processor 577, which is comparable to dynamic selective enhancement device 210 illustrated in FIG. 2. In this exemplary embodiment, dynamic selective enhancement is integrated within transmission rate controller 175. In this illustrative case, controller 175 dynamically determines those macroblocks that encompasses a desired portion of an image, which are to be selectively enhanced, adapts transmission sequence order for next/subsequent frame transmissions and transmits the image data over network 180 at a rate appropriate for the available bandwidth. Process 577 may further receive information over network 180 regarding user directed or requested selective enhancement. In this case, processor 577 responsive to the user requests for selective enhancement, which may be provided by I/O processor 525, may dynamically determine those macroblocks that encompass that requested image portion and adapt a transmission sequence order for next/subsequent transmission.

As would be appreciated, processor 577 or I/O processor 525 may be any means, such as general purpose or special purpose computing system, or may be a hardware configuration, such as a dedicated logic circuit, integrated circuit, Programmable Array Logic (PAL), Application Specific Integrated Circuit (ASIC), that provides known outputs, i.e., macroblock data, in response to known inputs, i.e., transmission sequence order.

In a alternative aspect of the invention, transmission controller 175, may automatically (absent user requests) selectively enhance designated areas of the transmitted image in order to provide better quality to receiving systems based on the available bandwidth. For example, a face-based enhancement rule, a motion-based segmentation rule, an importance mask-based enhancement rule, a center-based enhancement rule, etc., may automatically determine an area or areas of enhancement.

Figure 6:
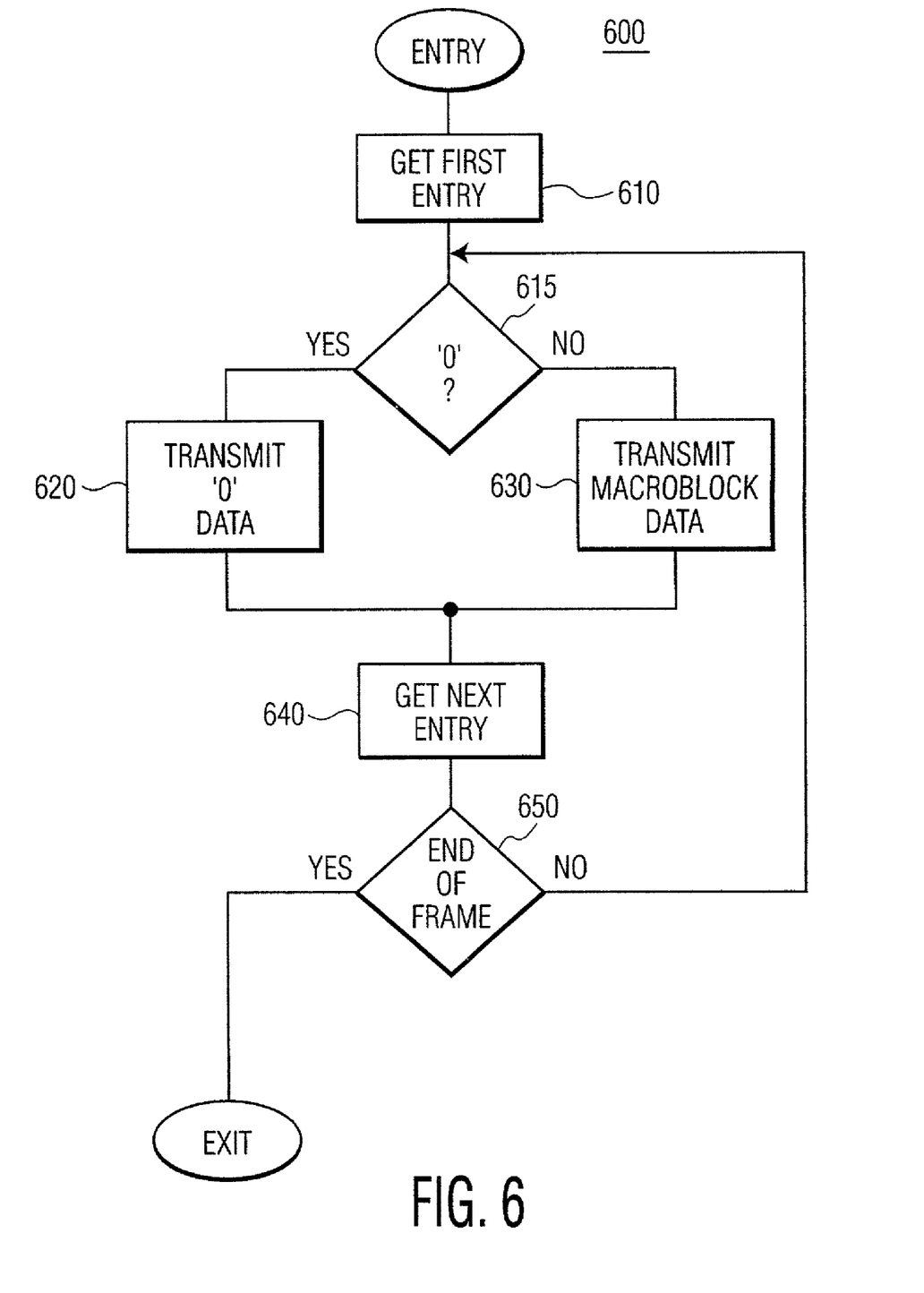
FIG. 6 illustrates a flow chart of an exemplary process for dynamically altering a frame transmission sequence of FGS encoded images in accordance with the principles of the present invention.

FIG. 6 illustrates a flow chart 600 of an exemplary process for transmission controller 175. In this exemplary process, a first pointer is selected at block 610. A determination is made at block 615 whether the selected pointer corresponds to a macroblock that is not significant. If the answer is in the affirmative, then a data block representative of a "0" pointer is selected for transmission, at block 620.

If, however, the answer is in the negative, then information items within the selected data block are selected for transmission, at block 630.

At block 640 a next pointer is selected. At block 650 a determination is made whether the selected next pointer is an end-of-frame marker. If the answer is the negative, then processing returns to the determination at block 615 to determine whether the selected next pointer is associated with a "null" block.

If, however, the answer is in the affirmative, then the processing for the selected frame transmission sequence table is completed.

Figure 7:
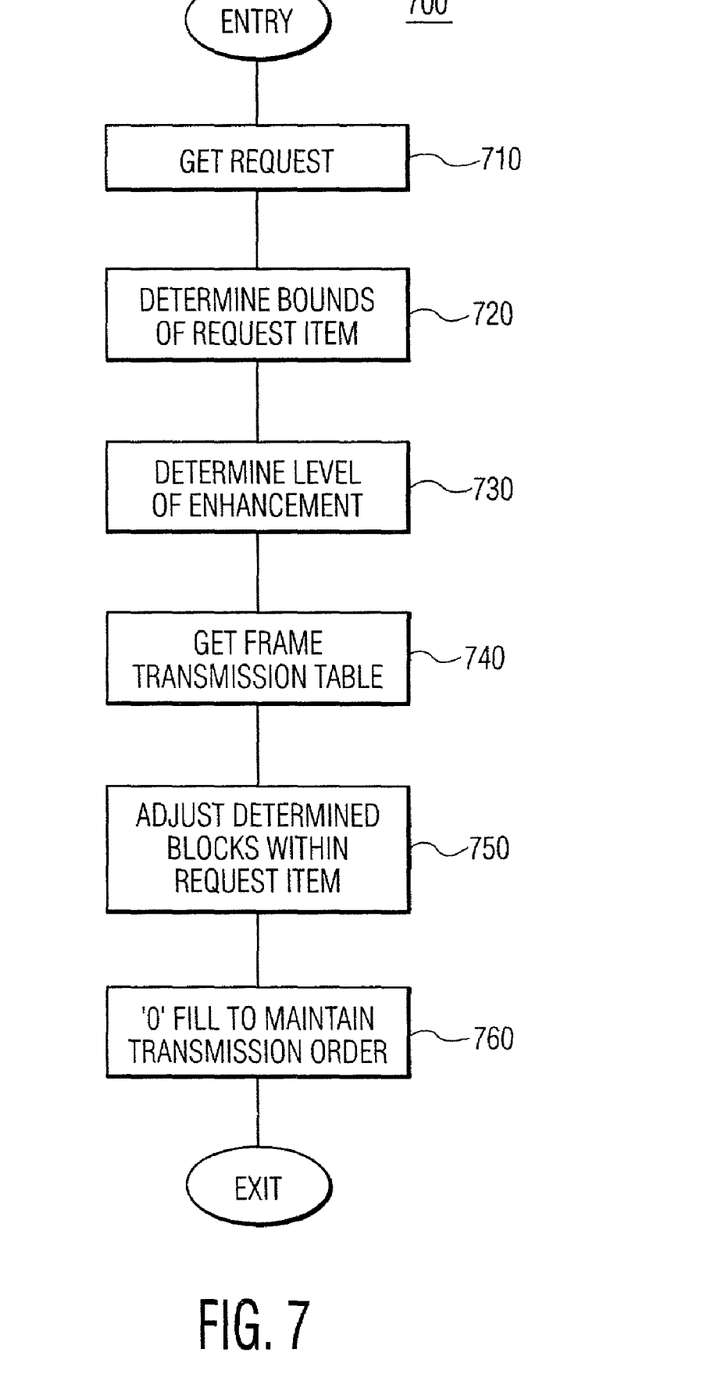
FIG. 7 illustrates a flow chart of an exemplary process for altering a frame transmission sequence of FGS encoded images in accordance with the principles of the present invention.

FIG. 7 illustrates a flow chart 700 of an exemplary process for dynamically adapting a frame transmission sequence table in accordance with the principles of the present invention. In this case, processor 577 determines that a designated area of an image is capable of being selectively enhanced. For example, processor 577 may receive a user request for selective enhancement of a portion of an image, at block 710, as is illustrates. In an alternative embodiment, processor 577 may determine, based on available bandwidth, that selective enhancement is appropriate.

At block 720 macroblocks associated with or encompass the selected image portion requested to be selectively enhanced are determined. Similarly, the level of enhancement is determined at block 730. At block 740 each next frame transmission sequence table is selected. Within each selected next frame transmission sequence table, the determined macroblocks associated with the requested selected enhancement area are adjusted, i.e., shifted or re-positioned, to enable the determined macroblocks to be assigned a higher transmission priority at block 750. At block 760, locations within each of the selected sequence tables not containing pointer data is filled to allow for a data block transmission that is representative of "0" data.

Figure 8:
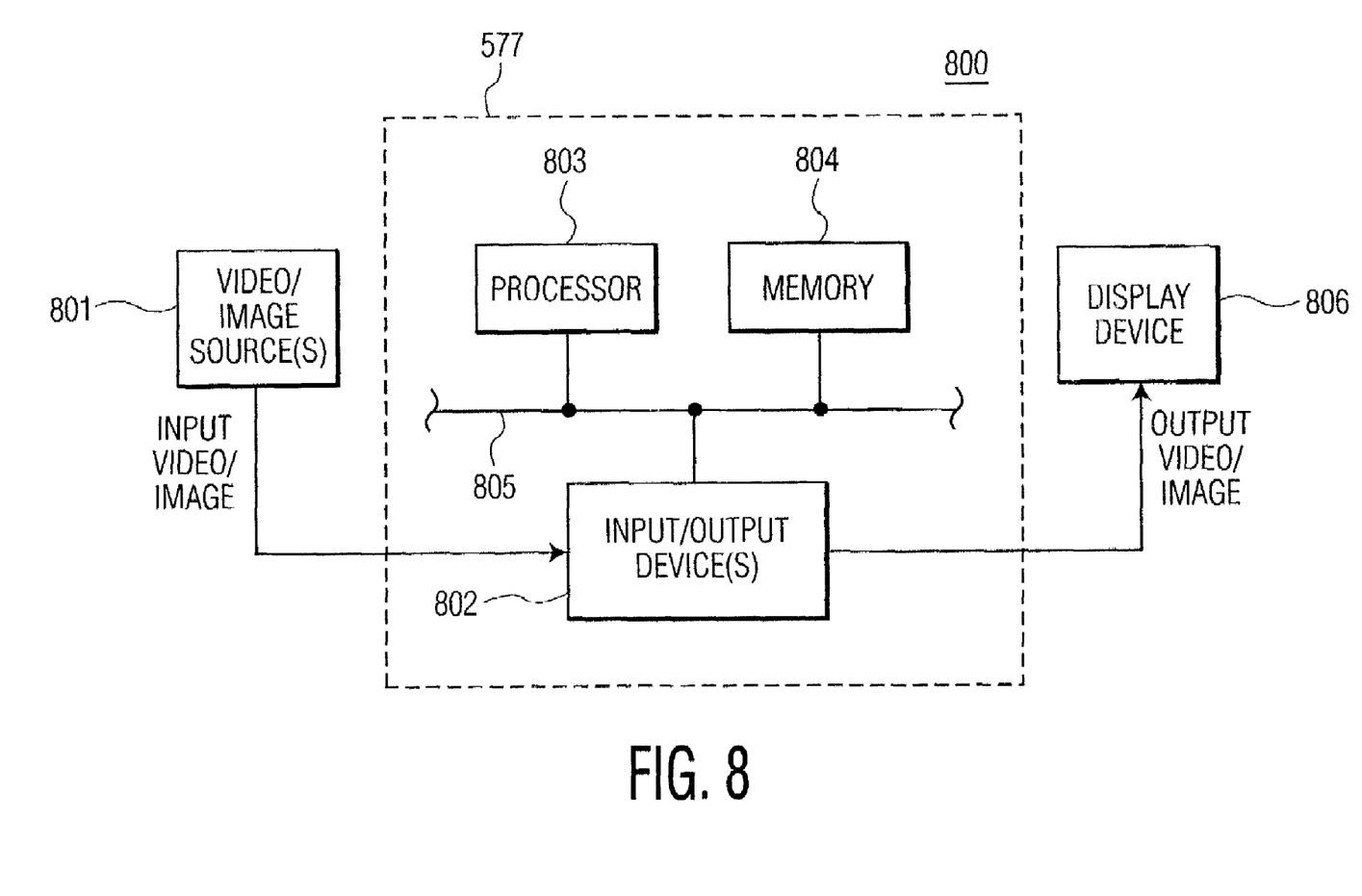
FIG. 8 illustrates an exemplary system for processing user requests in accordance with one aspect of the principles of the invention.

FIG. 8 illustrates an exemplary embodiment of a processor 577 which may be used for implementing the principles of the present invention. Processor 577 may represent a desktop, laptop or palmtop computer, a personal digital assistant (PDA), a video/image storage device such as a video cassette recorder (VCR), a digital video recorder (DVR), a TiVO device, etc., as well as portions or combinations of these and other devices. Processor 577 includes one or more input/output devices 802, a processor 803 and a memory 804. Memory 804 may be a semiconductor medium, such as RAM, ROM, Flash, Cache, a magnetic media, such as magnetic disk, or optical media, such a CD-ROM.

Processor 577 may access, through I/O device 802 one or more data sources 801, e.g. buffer 170, which may be received over a network (not shown). The source(s) 801 may alternatively represent one or more network connections for receiving information from a server or servers over, e.g., a global computer communications network such as the Internet, a wide area network, a metropolitan area network, a local area network, a terrestrial broadcast system, a cable network, a satellite network, a wireless network, or a telephone network, as well as portions or combinations of these and other types of networks.

The input/output devices 802, processor 803 and memory 804 may communicate over a communication medium 805. The communication medium 805 may represent, e.g., a bus, a communication network, one or more internal connections of a circuit, circuit card or other device, as well as portions and combinations of these and other communication media. Data from source(s) 801 is processed in accordance with one or more software programs stored in memory 804 and executed by processor 803 to alter transmission sequence order and to generate an output that may be supplied over a network (not shown) or to a display device 806.

In a preferred embodiment, the coding and decoding employing the principles of the present invention may be implemented by computer readable code executed by the system. The code may be stored in the memory 804 or read/downloaded from a memory medium such as a CD-ROM or floppy disk. In other embodiments, hardware circuitry may be used in place of, or in combination with, software instructions to implement the invention. For example, the elements illustrated herein may also be implemented as discrete hardware elements.

Although the invention has been described and pictured in a preferred form, it is, however, understood that the present disclosure has been made only by way of example, and that numerous changes in the details may be made without departing from the spirit and scope of the invention as hereinafter claimed. For example, the indicators described may be designated by individual settings that describe a specific method employed in a transmission frame. Or the indicators may be coded values with a fixed number of transmission bits within a transmission frame. Or the indicators may be a single setting that specifies the presence of a specific method employed in a transmission frame. It is intended that the patent shall cover by suitable expression in the appended claims, those features of patentable novelty that exists in the invention disclosed.

I claim:

1. A method for dynamically adapting a predetermined transmission sequence of a fine granular scalability (FGS) encoded video image composed of a plurality of macroblocks distributed among a plurality of bit-planes, to selectively enhance a desired portion of said video image, said method comprising the steps of:

determining which of said FGS encoded macroblocks in each of said bit-planes is associated with said desired portion of said video image;

determining an order of transmission of said determined FGS encoded macroblocks using said predetermined transmission sequence; and advancing said determined FGS encoded macroblocks in said order of transmission according to a known level of enhancement.

2. The method as recited in claim 1 further comprising the step of:

filling said order of transmission with a known value to maintain said transmission sequence.

3. The method as recited in claim 2 wherein said known value is representative of a not significant value.

4. The method as recited in claim 1 further comprising the step of:

determining said desired portion from a user request.

5. The method as recited in claim 1 further comprising the step of:

determining said known enhancement level from a user request.

6. The method as recited in claim 1 further comprising the step of:

determining said desired portion in accordance with at least one predetermined factor.

7. The method as recited in claim 6 wherein said at least one predetermined factor is selected from the group comprising: center of image, faces, and moving images.

8. The method as recited in claim 1 wherein further comprising the step of:

determining said enhancement factor in accordance with an available network bandwidth.

9. The method as recited in claim 1 wherein said predetermined transmission sequence is selected from the group comprising: horizontal, vertical, diagonal, raster, progressive, and interlaced scans.

10. A device for dynamically adapting a predetermined transmission sequence of a fine granular scalability (FGS) encoded video images composed of a plurality of macroblocks distributed among a plurality of bit-planes, to selectively enhance desired portions of said video image, said device comprising:
means for determining which of said FGS encoded macroblocks in each of said bit-planes is associated with said desired portion of said video image;
means for determining an order of transmission of said determined FGS encoded macroblocks using said predetermined transmission sequence; and
means for advancing said determined FGS encoded macroblocks in said order of transmission according to a known level of enhancement.

11. The device as recited in claim 10 further comprising:
means for filling said order of transmission with a known value to maintain said transmission sequence.

12. The device as recited in claim 11 wherein said known value is representative of a not significant value.

13. The device as recited in claim 10 further comprising:
means for determining said desired portion from a user request.

14. The device as recited in claim 10 further comprising:
means for determining said known enhancement level from a user request.

15. The device as recited in claim 10 further comprising:
means for determining said desired portion in accordance with at least one predetermined factors.

16. The device as recited in claim 15 wherein said at least one predetermined factor is selected from the group comprising: center of image, faces, moving images.

17. The device as recited in claim 10 wherein further comprising:
means for determining said enhancement factor in accordance with an available network bandwidth.

18. The device as recited in claim 10 wherein said predetermined transmission sequence is selected from the group comprising: horizontal, vertical, diagonal, raster, progressive, and interlaced scans.

19. A system for dynamically adapting a predetermined transmission sequence of a fine granular scalability (FGS) encoded video images composed of a plurality of macroblocks distributed among a plurality of bit-planes, to selectively enhance desired portions of said video image, said system comprising:
a memory including
code for determining which of said FGS encoded macroblocks in each of said bit-planes is associated with said desired portion of said video image;
code for determining an order of transmission of said determined FGS encoded macroblocks using said predetermined transmission sequence; and
code for advancing said determined FGS encoded macroblocks in said order of transmission according to a known level of enhancement; and
a processor in communication with said memory, said processor operable to execute said code.

20. The system as recited in claim 19 wherein said memory further includes:
code for filling said order of transmission with a known value to maintain said transmission sequence.

21. The system as recited in claim 20 wherein said known value is representative of a not significant value.

22. The system as recited in claim 19 wherein said memory further includes:
code for determining said desired portion from a user request.

23. The system as recited in claim 19 wherein said memory further includes:
code for determining said known enhancement level from a user request.

24. The system as recited in claim 19 wherein said memory further includes:
code for determining said desired portion in accordance with at least one predetermined factors.

25. The system as recited in claim 24 wherein said at least one predetermined factor is selected from the group comprising: center of image, faces, and moving images.

26. The system as recited in claim 19 wherein said memory further includes:
code for determining said enhancement factor in accordance with an available network bandwidth.

27. The system as recited in claim 19 wherein said predetermined transmission sequence is selected from the group comprising: horizontal, vertical, diagonal, raster, progressive, and interlaced scans.

28. The system as recited in claim 19 further comprising:
an input/output device in communication with said processor.

29. The system as recited in claim 28 wherein said input/output device is operable to receive or transmit information over a network.

30. The system as recited in claim 29 wherein said network is selected from the group comprising: POTS, Internet, LAN, WAN, and Intranet.

31. The system as recited in claim 30 wherein said user requests are received over said network.

* * * * *